Oct. 25, 1960
L. R. KOLLER
2,957,787
METHOD OF RENDERING TITANIUM DIOXIDE
FILMS ELECTRICALLY CONDUCTIVE
Filed Jan. 2, 1957
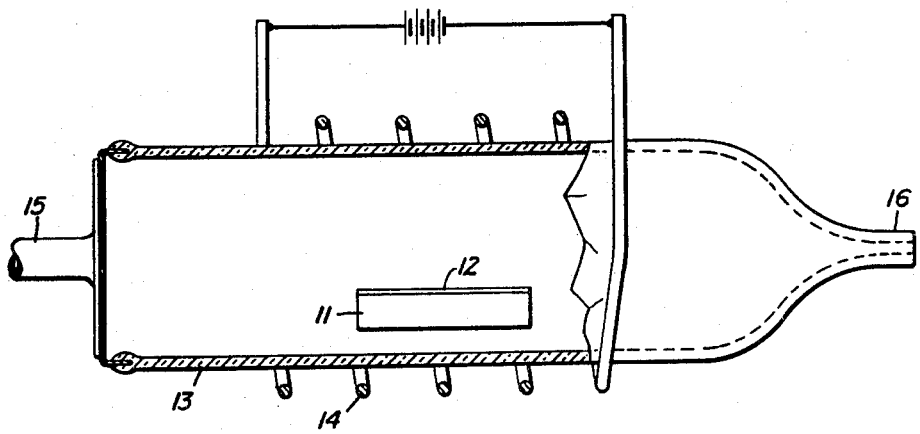
Inventor:
Lewis R Koller,
by Paul C. Frank
His Attorney.

United States Patent Office 2,957,787
Patented Oct. 25, 1960

2,957,787

METHOD OF RENDERING TITANIUM DIOXIDE FILMS ELECTRICALLY CONDUCTIVE

Lewis R. Koller, Schenectady, N.Y., assignor to General Electric Company, a corporation of New York Filed Jan. 2, 1957, Ser. No. 632,163

6 Claims. (Cl. 117—211)

The present invention relates to transparent titanium dioxide films and to methods for rendering such films conducting.

In the manufacture of certain types of luminescent screens for cathode ray tubes, the presence of a transparent conducting film between glass and screen is desirable and often necessary. Similarly, in the fabrication of electro-luminescent cells of the type disclosed and claimed in my Patent 2,709,765, which is assigned to the assignee of the present invention, the presence of a transparent conducting film is desirable.

To a large extent tin oxide films have been used in such applications. However, in some cases tin oxide is not satisfactory. For example, if a zinc or cadmium sulfide phosphor film is deposited at high temperatures on a transparent conducting film of tin oxide, the desirable characteristics of both films are destroyed. It is therefore desirable to prepare transparent conductive films which may be used in certain instances when tin oxide films may not be used.

One such film is titanium dioxide. One means for preparing a transparent conducting film of titanium dioxide is disclosed and claimed in Patent 2,732,313 to Cusano and Studer, which is assigned to the assignee of the present invention. Another method for the preparation of conducting titanium dioxide films is disclosed and claimed in my Patent 2,717,844, which is assigned to the assignee of the present invention.

In accordance with the first-mentioned process a layer of titanium dioxide is rendered conducting by the subsequent deposition thereupon of a zinc or cadmium sulfide luminescent film. In accord with the latter method a titanium dioxide film is rendered conducting by baking in contact with finely divided elemental zinc.

While both of these methods are satisfactory for the production of conducting transparent films, it is desirable that a simpler method be available for rendering titanium dioxide films conducting which method does not necessitate physically contacting the film with any other solid substance.

Accordingly, one object of the present invention is to provide an improved method for the rendering of titanium dioxide films conducting.

Another object of the invention is to provide an improved method for rendering titanium oxide films conducting which does not require physically contacting the film with any other solid substance.

In accord with the present invention, titanium dioxide films which are deposited upon a suitable substrate and which originally possess a relatively high resistivity, are rendered conducting by heating for a short period of time at elevated temperatures in a gentle flow of dry hydrogen or dry hydrogen sulfide.

The novel features believed characteristic of the invention are set forth in the appended claims. The invention itself, however, together with further objects and advantages thereof may best be understood by reference to the accompanying drawing which illustrates typical apparatus with which the invention may be practiced.

In the drawing, a suitable insulating substrate or baseplate 11 upon which there has been deposited a thin film 12 of titanium dioxide is suspended in a refractory reaction chamber 13 which is surrounded by a heating coil 14. Dry hydrogen or dry hydrogen sulfide is admitted to chamber 13 through inlet 15 and escapes therefrom through outlet 16.

Titanium dioxide coating 12 may first be formed upon substrate 11 by passing a stream of titanium tetrachloride vapor over the substrate in a moist atmosphere while the substrate is heated preferably, to a temperature of 200 to 250° C. Lower temperatures may be used but at lower temperatures (in the vicinity of 150° C.) the film becomes granular.

Film thicknesses may be measured by several means. For films greater in thickness than approximately 0.7 micron, optical measurements are most frequently used. Films of thickness below 0.7 micron may be measured, and the thickness thereof controlled in formation, by the observance of the apparent change of colors of the film due to the occurrence of successive orders of interference colors.

The thickness of the titanium dioxide film is not critical in practicing the invention, but rather is governed by the ultimate purpose of the resultant product. Thus, films which are to be used as electrodes for electro-luminescent cells are generally formed to a thickness evidenced by the formation of the second or third order of the interference colors (approximately 0.2 to 0.4 micron). Titanium dioxide films varying in thickness from .1 micron up to approximately 1 micron may readily be rendered conducting in accord with the present invention.

As formed, titanium dioxide layer 12 has a very high resistance, the order of several thousand megohms per square, and is not suitable as a conductor or as an electrode for an electroluminescent cell. Such a layer, however, upon treatment in accord with this invention may be rendered conducting. In order to do so, substrate 11, which may conveniently be glass, Pyrex glass, Vycor glass or quartz, is suspended or otherwise supported within chamber 13 and electrical power is supplied to resistance heater coil 14 to raise the temperature of substrate 11 and titanium dioxide film 12 to approximately 500 to 700° C. This temperature is maintained for approximately 5 minutes, or longer, while a gentle flow of dry hydrogen or dry hydrogen sulfide is maintained through chamber 13. The rate of gas flow is not critical, and may be so slow as to have a linear velocity of approximately several feet per minute. While there is apparently no upper limit to the velocity which may be utilized, no apparent increase in desirable results is attained thereby. The stream must, however, move, even if at a slow rate. If there is no relative motion, low resistivities cannot be obtained.

No special steps must be taken in order to evacuate chamber 13 prior to the entry of the dry hydrogen sulfide or dry hydrogen. The pressure within chamber 13 remains at approximately 1 atmosphere pressure, and exhaust gases exhaust through outlet 16 at which they may conveniently be burned or piped away. It will be appreciated, however, that higher or lower pressure may be utilized, but atmospheric pressure is unquestionably the most convenient.

In the practice of my invention, I have found that a temperature of 500 to 700° C. produces titanium dioxide films having resistivities of the proper order of magnitude suiting the films for use as electrodes or conducting films. If the process is performed at a temperature lower than 500° C., the optimum low values of resistivity are not obtained. If the process is performed at temperatures higher than 700° C., water vapor, which may be absorbed by substrate 11 may be liberated.

I have found that it is essential that the atmosphere within chamber 11 be completely dry in order that low resistivities be obtained. It is for this reason I utilize dry hydrogen sulfide or dry hydrogen in the practice of my invention. For the purposes of this invention, the terms "dry hydrogen" and "dry hydrogen sulfide" are intended to mean these gases having dew points of lower than —0° C. In addition to the deleterious effects of the liberation of water vapor from substrate 11 at temperatures in excess of 700° C., it is impossible to perform this process at higher temperatures than 700° C. if substrate 11 is of glass, since at these high temperatures glass becomes fluid.

The time utilized in the practice of my process is not critical. The process must, however, be carried out for a minimum of approximately 5 minutes. For times in excess of 5 minutes, a definite increase in the desirable resistivity characteristics of the resultant product are obtained up to 20 minutes, after which no desirable increase is noted, although no undesirable effect is introduced by carrying out the process for several hours if desired. Accordingly, I prefer that the process be carried out for from 5 to 20 minutes at a temperature from 500 to 700° C. In Table I below are listed the resistivities attained for some 1 micron thick titanium dioxide films treated in accord with the invention. The resistivities are listed as corresponding to the temperature at which the apparatus was operated. All of the samples listed in Table I were heated for 20 minutes at the indicated temperature.

*Table I*

| Heating temperature: | Resistivity (ohms per square) |
| --- | --- |
| 500 | 3500 |
| 550 | 2500 |
| 600 | 3000 |
| 650 | 1000 |
| 700 | 600 |

In accord with one specific example of the practice of my invention, the apparatus illustrated in the drawing is used. Chamber 13 is approximately 12 inches long and 6 inches in diameter. A Pyrex glass plate approximately 4 inches in diameter having thereon a film of titanium dioxide 1 micron in thickness prepared in accord with the previously described method is supended with chamber 13. Commercial hydrogen gas at approximately 1 atmosphere pressure is passed through a "Deoxo" catalytic hydrogen purifying unit which removes oxygen from the gas, and a single drying tube filled with calcium hydride. The measured dew point of the hydrogen gas after drying is —45° F. This gas is then introduced into chamber 13 at a rate of 1 cubic foot per minute. Electrical energy is supplied to coil 14 to raise the temperature of substrate 11 to 600° C. and maintained at this temperature for 20 minutes. After this time, electrical energy is discontinued and the substrate is allowed to cool. After substrate 11 has returned to its equilibrium temperature, it is removed and titanium dioxide film 12 is found to have a resistivity of approximately 3000 ohms per square.

In accord with another specific example a titanium dioxide film having a similar low resistivity is produced exactly as in accord with the above example except that hydrogen sulfide gas is used rather than hydrogen.

While the invention has been disclosed with respect to certain practices thereof, it is apparent that many changes and modifications will immediately occur to those skilled in the art. Accordingly, I intend by the appended claims to cover all such changes and modifications as fall within the true spirit and scope of the foregoing disclosure.

What I claim as new and desire to secure by Letters Patent of the United States is:

1. The method of rendering a film of titanium dioxide conducting, which method comprises, supporting a film consisting of titanium dioxide out of contact with any solid substance other than the supporting substrate within a reaction chamber at elevated temperature in an atmosphere of a gas selected from the group consisting of dry hydrogen and dry hydrogen sulfide.

2. The method of rendering a film of titanium dioxide conducting, which method comprises, supporting a film of titanium dioxide out of contact with any solid substance other than the supporting substrate within a reaction chamber at elevated temperature and passing a flow of a gas selected from the group consisting of dry hydrogen and dry hydrogen sulfide over the heated titanium dioxide film.

3. The method of rendering a film of titanium dioxide conducting, which method comprises, supporting a film of titanium dioxide out of contact with any solid substance other than the supporting substrate within a reaction chamber, raising the temperature of the film to 500 to 700° C. and maintaining the film at that temperature while passing a flow of a gas selected from the group consisting of dry hydrogen and dry hydrogen sulfide over the titanium dioxide film.

4. The method of rendering a film of titanium dioxide conducting, which method comprises, supporting a film of titanium dioxide out of contact with any solid substance other than the supporting substrate within a reaction chamber at a temperature of 500 to 700° C., maintaining the film at elevated temperature for a period greater than five minutes while passing a flow of gas selected from the group consisting of dry hydrogen and dry hydrogen sulfide over the titanium dioxide film.

5. The method of rendering a film of titanium dioxide conducting, which method comprises, supporting a film of titanium dioxide out of contact with any solid substance other than the supporting substrate within a reaction chamber at a temperature of from 500 to 700° C., maintaining the film at elevated temperature for a period of 5 to 20 minutes while passing a flow of a gas selected from the group consisting of dry hydrogen and dry hydrogen sulfide at a rate of at least several feet per minute over the titainium dioxide film.

6. The method of rendering a film of titanium dioxide conducting, which method comprises, supporting a film of titanium dioxide out of contact with any solid substance other than the supporting substrate within a reaction chamber at a temperature of 500 to 700° C., maintaining the film at said temperature for a period of 5 to 20 minutes while passing a flow of a gas selected from the group consisting of dry hydrogen and dry hydrogen sulfide at a pressure of approximately 1 atmosphere over the titanium dioxide film.

References Cited in the file of this patent

UNITED STATES PATENTS

| | | |
| --- | --- | --- |
| 2,651,585 | Lytle et al. | Sept. 8, 1953 |
| 2,709,765 | Koller | May 31, 1955 |
| 2,715,593 | Clark | Aug. 16, 1955 |
| 2,717,844 | Koller | Sept. 13, 1955 |
| 2,732,312 | Young | Jan. 24, 1956 |
| 2,732,313 | Cusano et al. | Jan. 24, 1956 |
| 2,879,184 | Coghill | Mar. 24, 1959 |